(12) United States Patent
Dryer (10) Patent No.: US 7,451,321 B2
(45) Date of Patent: Nov. 11, 2008

(54) ELECTRONIC SIGNATURE MANAGEMENT METHOD

(76) Inventor: Joseph Ernest Dryer, 10307 Sugar Hill Dr., Houston, TX (US) 77042

(*) Notice: Subject to any disclaimer, the term of this patent is extended or adjusted under 35 U.S.C. 154(b) by 854 days.

(21) Appl. No.: 10/680,530

(22) Filed: Oct. 7, 2003

(65) Prior Publication Data

US 2005/0076215 A1     Apr. 7, 2005

(51) Int. Cl.
*H04L 9/00* (2006.01)
(52) U.S. Cl. .................. 713/177; 713/157; 713/170; 707/203; 726/2
(58) Field of Classification Search ............. 713/170, 713/176, 186, 180, 177; 707/203, 500; 726/26
See application file for complete search history.

(56) References Cited

U.S. PATENT DOCUMENTS

| | | | | |
|---|---|---|---|---|
| 5,367,573 A * | 11/1994 | Quimby | ............. | 713/167 |
| 5,606,609 A * | 2/1997 | Houser et al. | ............. | 713/179 |
| 5,689,567 A * | 11/1997 | Miyauchi | ............. | 713/176 |
| 5,915,024 A * | 6/1999 | Kitaori et al. | ............. | 713/176 |
| 6,253,323 B1 * | 6/2001 | Cox et al. | ............. | 713/176 |
| 6,671,805 B1 * | 12/2003 | Brown et al. | ............. | 713/176 |
| 6,751,632 B1 * | 6/2004 | Petrogiannis | ............. | 707/104.1 |
| 6,796,489 B2 * | 9/2004 | Slater et al. | ............. | 235/379 |
| 6,907,529 B1 * | 6/2005 | Hirose | ............. | 726/5 |
| 6,912,660 B1 * | 6/2005 | Petrogiannis | ............. | 713/181 |
| 6,917,950 B2 * | 7/2005 | Mcbride et al. | ............. | 707/203 |
| 6,920,609 B1 * | 7/2005 | Manber et al. | ............. | 715/513 |
| 7,039,805 B1 * | 5/2006 | Messing | ............. | 713/170 |
| 7,039,807 B2 * | 5/2006 | Spitz | ............. | 713/170 |
| 7,069,443 B2 * | 6/2006 | Berringer et al. | ............. | 713/180 |
| 7,162,635 B2 * | 1/2007 | Bisbee et al. | ............. | 713/176 |
| 2002/0040431 A1 * | 4/2002 | Kato et al. | ............. | 713/168 |
| 2002/0052896 A1 * | 5/2002 | Streit et al. | ............. | 707/517 |
| 2002/0083090 A1 * | 6/2002 | Jeffrey et al. | ............. | 707/501.1 |
| 2002/0099666 A1 * | 7/2002 | Dryer et al. | ............. | 705/71 |
| 2003/0028494 A1 * | 2/2003 | King et al. | ............. | 705/71 |
| 2003/0221109 A1 * | 11/2003 | Boyer et al. | ............. | 713/176 |
| 2004/0054906 A1 * | 3/2004 | Carro | ............. | 713/171 |
| 2004/0233040 A1 * | 11/2004 | Lane et al. | ............. | 340/5.86 |
| 2004/0255116 A1 * | 12/2004 | Hane et al. | ............. | 713/161 |

* cited by examiner

*Primary Examiner*—Nasser Moazzami
*Assistant Examiner*—Shanto M Abedin (57) ABSTRACT

An apparatus for creating a framework for the creation, editing, signing and signature verification of multiple documents includes a master, or cover, document as a holder and display source for the subdocuments created within the cover document. The cover document is protected against direct modification with the possible exception of the addition of comments that do not affect digital signatures in the cover document. Access to the subdocuments for editing, signature generation and signature verification is through a menu associated with the cover document. A method of creating a hierarchy of approval signatures on the cover document encompassing subdocuments and nested approval signatures is described.

20 Claims, 6 Drawing Sheets

ELECTRONIC SIGNATURE MANAGEMENT METHOD

CROSS-REFERENCE TO RELATED APPLICATIONS

This application claims benefit of no related applications.

TECHNICAL FIELD OF THE INVENTION

This invention generally relates to an improvement in the management of multiple digital signatures within a master document.

BACKGROUND OF THE INVENTION

The use of digital signatures as is disclosed in U.S. Pat. No. 4,405,829 issued to Rivest et al. is a method well accepted for document authentication. The usual implementation of digital signatures involves the combination of the signer's personal private key with a hashed representation of a document to create a unique digital signature.

There are sometimes problems associated with the authentication of documents using digital signatures. Digital signatures are attached to entire documents, while often there is a need to manage a hierarchy of signatures where signatures within the hierarchy are interrelated. Military logs, as an example, are a compilation of lesser documents (watches), each of which is the responsibility of a different individual. While the individual watches are subject to modification, such modification cannot be done without destroying the integrity of that watch signature and any higher-level approval signature. Treating the watches as a collection of individually sighed documents without a controlling structure is awkward.

Previous document management schemes either do not allow for the management of the editing of signed documents or require programmed hierarchy information for verification purposes only. For example, in U.S. Pat. No. 5,915,024 by Kitaori et al allows separation of a master document into subdocuments and the signature generation for each subdocument, but does not allow editing and control of the establishment of the subdocuments as a part of the signature creation.

The verification of such segmented documents is also addressed in U.S. Pat. No. 5,661,805 by Miyauchi, allowing the inclusion of relational information to generate document verification but again does not address the maintenance of modifications to the sections subject to signature.

Figure 1:
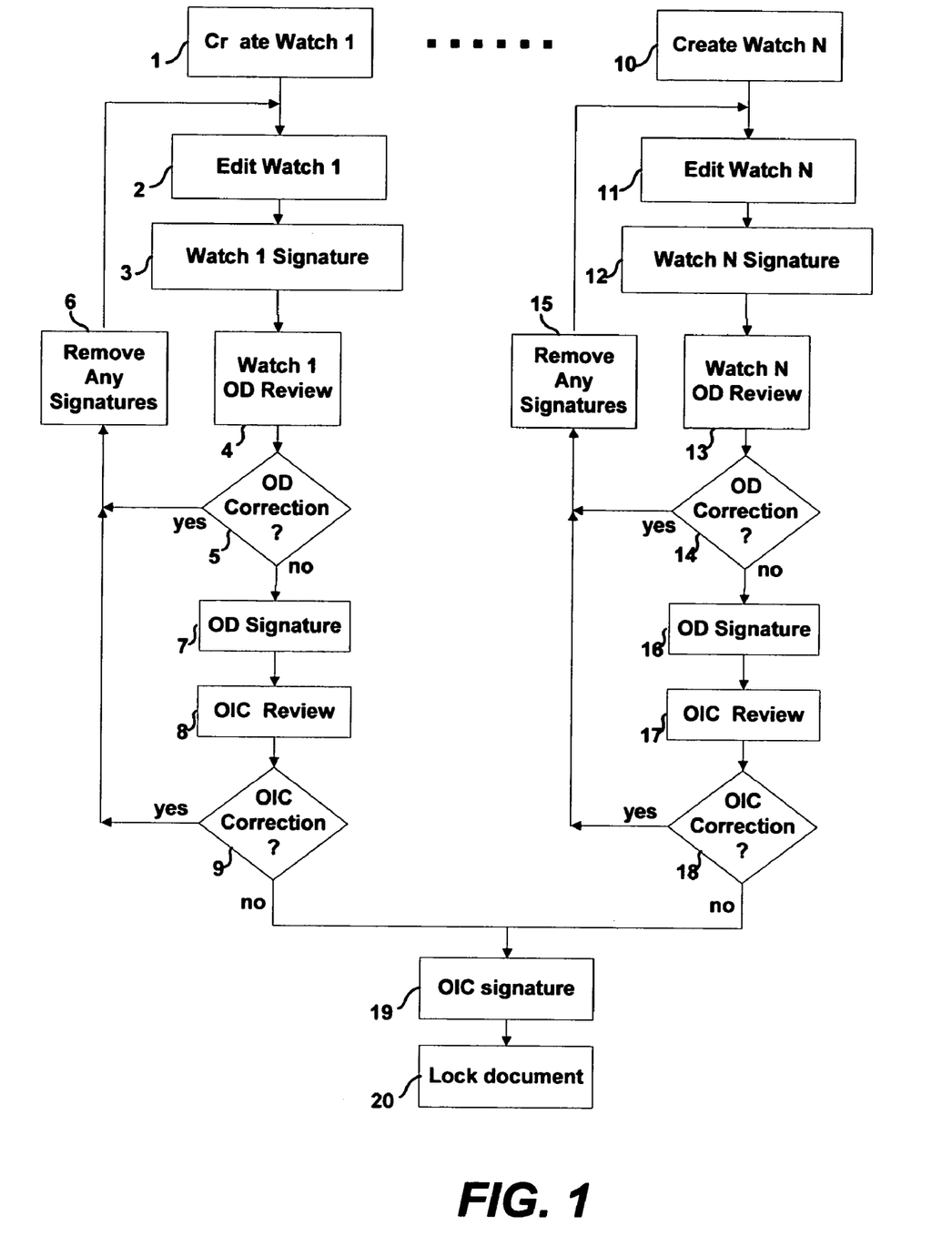
FIG. 1 illustrates a flow chart for the creation of a military watch document.
Figure 6:
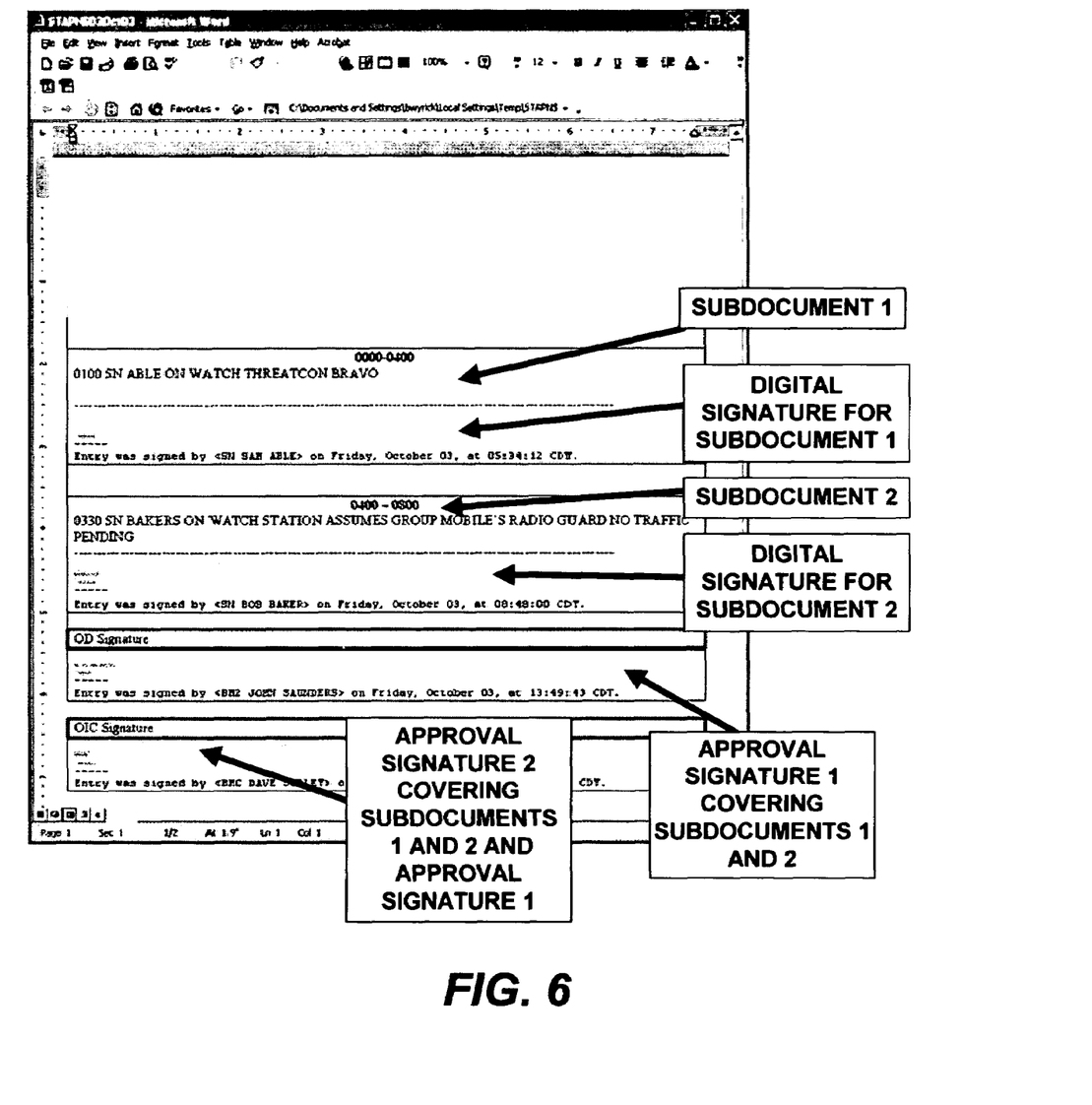
FIG. 6 illustrates a military log incorporating the structure of this invention.

FIG. 1 illustrates the problems associated with the normal document creation procedure. While this Figure and the following discussion describe a military log, it is intended that this be only an example of similar problems within and without the government. After individual watches are recorded (steps 1, 2 and 3 or 10, 11 and 12) they are presented to the officer of the day (OD) for review (step 4 or 13), and possibly correction (step 5 or 14). When corrected, any watch signature must be redone (step 6 or 15). After the OD signs a watch (step 7 or 16) it is then reviewed by the Officer in Charge (OIC) (step 8 or 17). The OIC can order revisions (step 9 or 18). If revisions are then made to a watch, both the watch signature, if made, and the OD signature, if made, must be redone (step 6 or 15). The OIC then signs the watch entries as a final approval after all revisions are made (step 19), after which no corrections can be made (step 20). FIG. 6 illustrates a military log showing some relationships of the log approvals.

While the single watches can be signed as a single document in the traditional manner, the single acceptance signature signifying the approval of the collection of watches, and the invalidation of approval signatures if another watch in the collection of watches is modified makes desirable the compilation of the individually-signed watches as a unified document.

An ancillary problem present in the approval process for documents is the case where a reviewer questions the content of a document he must approve prepared by another. Since often the review process is through a document transfer rather than a face-to-face meeting, such comments are often best managed by inclusion within the document under review. If an existing signature encompasses this document then the embedding of questions by a reviewer could cause the invalidation of the signature if steps were not taken to protect against that event. The inclusion of comments outside the document under review prevents a precise localization of the area under question within the document. The automatic revocation of a digital signature when a comment is inserted to avoid the presence of an invalid signature would cause an unnecessary resigning step if the comment were resolved without a change to the document.

TERMS DEFINED

In the description of this invention the term "cover document" is applied to a document that serves as a protected container document for representations of the digital signatures and the subdocuments. The term "subdocument" is applied to a collection within the cover document of text, video, audio, graphical or pictorial data, or a mixture of these data forms, that is to be given a digital signature. The term "subdocument object" is applied to a separate representation of a subdocument that is created for manipulation during the process of editing, signature generation or signature verification. The term "approval signature" is applied to a digital signature that signs a range of the cover document including one or more subdocuments or digital signatures on the cover document. The term "approval range" is applied to the section or sections of the cover document to which a particular approval signature applies.

SUMMARY OF THE INVENTION

It is therefore the first object of this invention to provide a method for the control of the signature process to allow controlled creation, modification, signature generation and signature verification of the subdocuments in a single cover document.

It is a second object of the present invention to provide approval signatures for any cover document approval range and to present in the cover document the approval signature and supporting approval signature information.

It is a third object of the present invention to provide a method of applying comments in the cover document without affecting the digital signature of a subdocument or approval range that encompasses the comment.

In order to achieve the above objects according to the first aspect of the present invention, there is provided a method of adding electronic signatures, comprising the steps of:

creating a protected cover document for the creation, display and editing of the composite subdocuments and for controlling through the cover document access to the subdocuments for creation, editing, signature generation or signature verification;

creating through a menu associated with the cover document an access to the subdocument for edit and display of the subdocument in the cover document;

creating through a menu associated with the cover document the transmission of a subdocument object to a signature-generation program to allow creation of a digital signature for each subdocument and for the verification of that digital signature; and providing in the cover document a display and/or storage of any digital signature created for a subdocument, together with the information required or useful to use the digital signature.

According to the second aspect of the present invention the steps described in the first aspect is augmented by the ability to add to the cover document approval signatures representing approval or acknowledgment of a section of the cover document. This allows a hierarchy of approval signatures on the cover document where each approval signature represents authority over an approval range of the cover document, possibly including subdocuments, subdocument signatures and other approval signatures. Control features conditioning obtaining an approval signature can be added, such as not allowing approval signatures unless the approved documents are signed, removing the approval signature if the subdocument is edited, prohibiting the editing of subdocuments within a signed approval signature range, or requiring a proper user authorization level before a user can generate an approval signature. This approval level can be established by an authorization level stored in the signature-generation PKI or by a list of authorized signers for any signature stored in the cover document control software.

To achieve this second aspect of the present invention there is then provided a method of adding electronic signatures, comprising the steps of:

creating a protected cover document for the creation, display and editing of the composite subdocuments and for controlling through the cover document access to the subdocuments for creation, editing, signature generation or signature verification;

creating through a menu associated with the cover document the ability to access and edit a representation of the subdocument object that is then transferred to a visible, protected display in the cover document;

creating through a menu associated with the cover document a means for the transmission of a subdocument to a signature-generation program to allow creation of a digital signature for each subdocument and for the verification of that digital signature;

providing through a menu associated with the cover document a display and/or storage of any digital signature created for a subdocument, together with the information required or useful to use the digital signature;

providing through a menu associated with the cover document the generation of an approval signature for an approval range of the cover document including one or more subdocuments, any associated digital signatures and accompanying signature information, or other approval signatures;

providing protection to the integrity of the approval signature by either preventing the editing of subdocuments within the approval range for a signed approval signature or destroying any approval signature whose approval range includes an edited subdocument; and providing in the cover document a display and/or storage of any approval signature, together with the information required or useful to use the approval signature.

According to the third aspect of the present invention the steps described previously are augmented by the ability to add comments to the cover document. These comments could, for example, pertain to questions raised in the approval process. These comments are removed from the calculation of the subdocument digital signature according to the first aspect of this invention and any approval electronic signature generated according to the second aspect of this invention. The added comments can be either text, audio, graphical, images or video clips. To achieve this third aspect there is then provided a method of adding electronic signatures, comprising the steps of:

providing in the cover document a method of inserting comment objects; and providing in the transmission of a subdocument object to a signature-generation program in the creation or verification of a subdocument digital signature that any reference to the comments objects be deleted prior to the transmission to the signature-generation program.

DETAILED DESCRIPTION OF THE INVENTION

The preferred embodiments of the present invention will be described in the following discussion in terms of the functionality provided by Microsoft Word, but the extension to other programmatic implementations is obvious to those skilled in the art.

Figure 2:
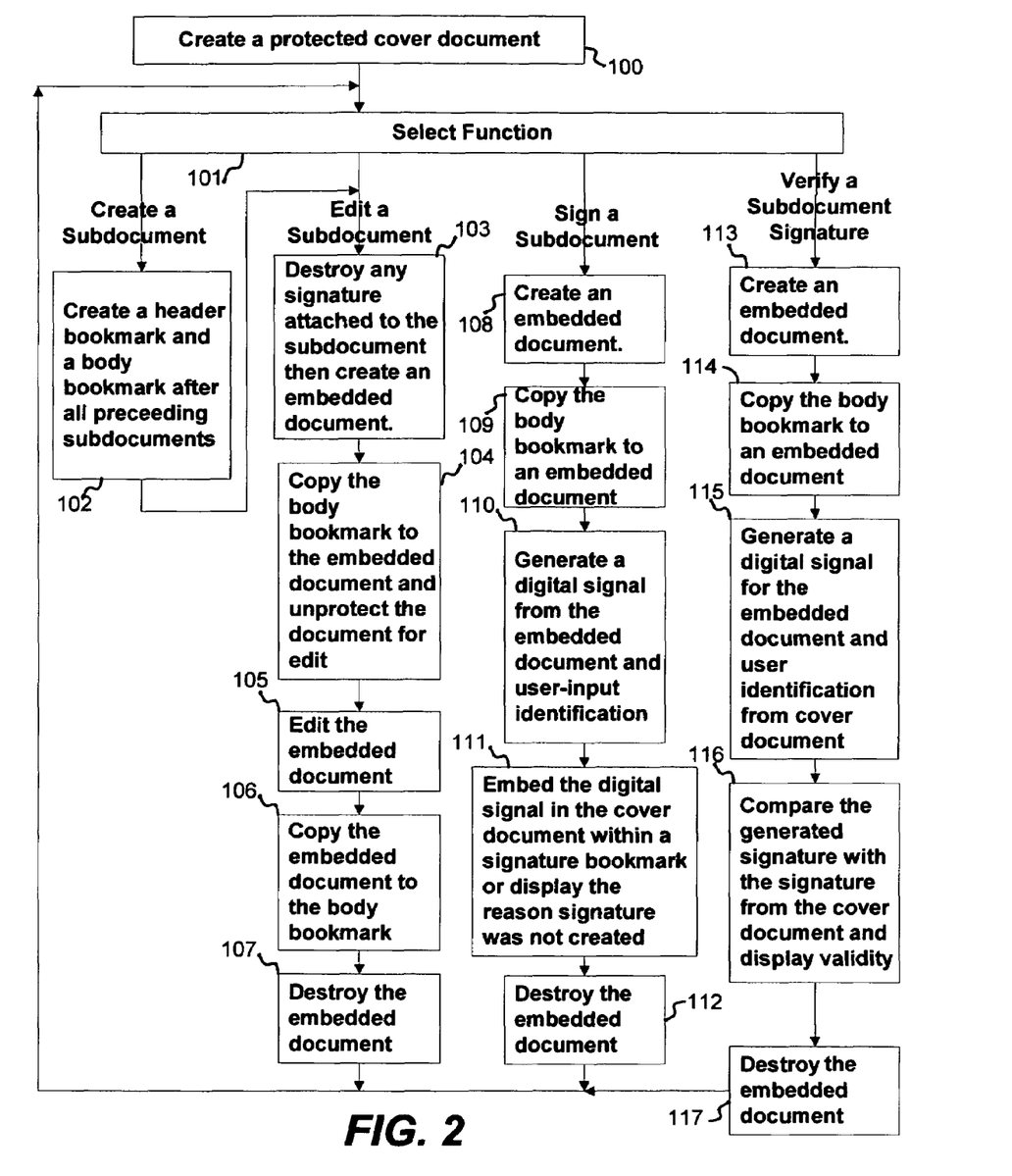
FIG. 2 illustrates a flow diagram for the use of the methods of this invention in the creation of a cover document and the creation, editing, signing and signature verification of subdocuments within the cover document.

The First embodiment of the present invention is discussed with reference to FIG. 2. A cover document is first created as represented by 100 to serve as a container for subdocuments created by more than one individual or at more than one time. This document is protected from user entry but the user has access to menu functions (101), including allowing the creation of a subdocument as shown in the path leading to 102. If the creation of a subdocument is selected, a subdocument area is reserved in the cover document, either as the first or last subdocument in the cover document or at a pre-selected or user-selected place within the cover document. This subdocument area is delineated by the creation of one or more reserved areas, or bookmarks, within the cover document. In the preferred embodiment this is accomplished by the creation in step 100 of a password-protected Word document from a Word template document containing embedded macros accessed through toolbar icons to accomplish the functions shown in step 101. The preferred embodiment further creates a reserved space as shown in step 102 by creating within the cover document a header bookmark and a body bookmark for each subdocument after all the previously existing subdocuments.

There is also a menu item in the cover document menu selection 101 for the editing of subdocuments created in step 102. Since the editing of a previously signed document will destroy the validity of the signature, the user can be programmatically prevented from editing a subdocument if there is a desire to maintain the current signature. If the user is allowed to edit a signed document and proceeds with the editing then as is shown in step 103, any previous digital signature attached in the cover document to the subdocument to be edited is destroyed and the subdocument becomes an unsigned document in the cover document. Alternatively, the destruction of any digital signature can be deferred until step 306 to allow destruction only in the case where the subdocument content is actually modified during the edit process. A subdocument object is created representing an image of this subdocument and this subdocument object is made accessible to the user and opened for editing as shown in step 103. If previous editing has created content in the subdocument then this previous content is copied from the cover document to the subdocument object as shown in step 104. In the preferred embodiment, this subdocument is opened as an unprotected, editable Microsoft Word Document inserted as an object within the cover Microsoft Word Document or created as a separate temporary Word Document. Any existing cover document content for the subdocument is copied from the body bookmark in the cover document and pasted into the editable Word document. This editable inserted Word document in the preferred embodiment can be formatted as required, as by the selection of a template for opening the subdocument.

The user can be given full access to the subdocument object for editing with word processing tools well known in the trade to enter and modify the subdocument content as shown in step 105. When the user has finished with the edit, a menu item is selected which closes and copies the subdocument object to the cover document and then optionally destroys the subdocument object, as shown in steps 106 and 107. This allows a complete image of the subdocument to reside on the cover document with restricted access while allowing the creation as needed of full reproductions in the subdocument object. In the preferred embodiment this step is accomplished by allowing editing of the Microsoft Word document created in the previous step, then cutting and pasting that document into the subdocument body bookmark area of the cover document, which is maintained as a protected document. The Word document opened for edit is then deleted.

While this discussion has described maintaining the master version of the subdocument in the cover document and creating an image of that master document to present for editing, it is within the scope of this invention to maintain the master copy of the subdocument as an embedded or external object, with a representation of the object in the cover document. In this implementation the subdocument object is not deleted between editing sessions, but access to the subdocument is still through the cover document in order to protect the subdocument from alteration. This is accomplished, as one example, by creating an embedded Microsoft Word document within the cover document, and maintaining the embedded document as a displayed document on the protected cover page, and programmatically limiting access to the embedded Word document for editing purposes. As another alternative, the subdocument can be maintained in the cover document and a portion of the cover document encompassing the subdocument opened up for editing while protecting the remainder of the document.

Another possible menu selection in the cover document is the choice to digitally sign a subdocument, as shown in the selection path starting with 108. As in the menu selection for editing a subdocument, a subdocument object is created and any existing subdocument content is copied into the subdocument object, as shown in steps 108 and 109. In the preferred embodiment, this subdocument is opened as a Microsoft Word Document inserted as an object within the cover Microsoft Word Document or created as a separate temporary Word Document. The contents of the subdocument body bookmark in the cover document are then copied and pasted into the subdocument object. Any desired deletions from the subdocument object content, e.g. formatting characters, can be removed from the subdocument object content. The subdocument object content is then communicated to a digital signature-generation external program or module, together with identifying information input by the user as shown in step 110. The process of generating the digital signature from the hashed representation of the content and the user's private key is well known in the literature. The digital signature-generation program or module will return a digital signature or an abort notice defining why the digital signature could not be created. The subdocument object is then destroyed as shown in step 112. This step can be performed before, after or simultaneously with the recording of information to the main document in step 111.

If a digital signature is obtained, this is information is recorded in the cover document as shown in step 111 with appropriate delineation. This is accomplished in the preferred embodiment by copying the digital signature from the digital signature-generation program into the cover document and delineating the signature by the creation of a signature bookmark enclosing the signature in the cover document following the body bookmark, and an enclosing box visible in the cover document. If the digital signature cannot be obtained, as, for instance, when the user identity is not recognized by the signature-generation program, the reason for the failure of the signature generation as contained in the abort notice is displayed to the user. The digital signature can be augmented by additional information commonly associated with the digital signature, e.g. the date and identity of the signer or the public key of the signer. Any amount of this information, for example the public key, can be represented in a non-printing form, such as hidden text or an embedded object, to avoid encumbering the appearance of the cover document while keeping the information available for verification purposes.

At the time the cover document is created the format of the cover document can be made to be in a form suitable for printing or data parsing. In the preferred embodiment this is accomplished by the creation of the cover document through a Microsoft Word template document (.DOT), which also contains the macros for the creation of the menus and their implementation. This document form can reflect the presence and location of the subdocuments and digital signatures and the status of a subdocument, e.g. unsigned documents being highlighted or distinctively outlined, or the number of subdocuments being displayed in the cover document.

Another possible menu selection associated with the cover document is the choice to verify the digitally signed subdocument, as shown in the selection path starting with 113. As in the menu selection for editing a subdocument, a subdocument object is created and any existing subdocument content is copied into the subdocument object, as shown in steps 113 and 114. In the preferred embodiment, this subdocument is opened as a Microsoft Word Document inserted as an object within the cover Microsoft Word Document. The contents of the subdocument body bookmark in the cover document are then copied and pasted into the subdocument object and edited to remove undesired characters. In step 115 a digital signature is generated from the subdocument object content as was done in step 110 with the exception that in step 115 the user identification information is obtained from the cover document. The generated digital signature is compared with the digital signature stored in the cover document previously obtained in step 110. An agreement of these digital signatures is an indication that the digital signature recorded on the cover document is valid, and therefore the document has not been modified. It should be noticed that this verification function is an internal feature of many signature-generation programs and in that case the comparison need not be done within the cover document control program.

A discussion of the second embodiment of this invention will be made with reference to FIG. 3. This embodiment allows the creation of a hierarchy of signed subdocuments where an approval signature can be added to the cover document encompassing a range of cover document content, possibly including subdocuments, subdocument signatures and/or associated information, and other approval signatures and/or associated information.

A cover document is created and one or more subdocuments are created and then signed in this cover document as has been previously described and as is indicated by steps 200-206. A range of the cover document to be encompassed by the approval signature (the "approval range") is determined, possibly including these subdocuments, associated digital signatures and other approval signatures. This approval range can be predefined or user-selectable, and need not be contiguous. The approval range may be indicated on the cover document either by the position of the subdocuments and approval signature in the cover document or by a selection process and an indication within the cover document of the range of subdocuments approved. If desired, the approval can be prohibited programmatically if one or more subdocuments within the approval range have no digital signature.

The content of the approval range is copied to a subdocument object and a digital signature is created from this content together with user-input signer identification information as shown in step 207. The generation of this signature is in the same form as was utilized in FIG. 2 steps 108-112, consisting of the editing of the subdocument object to remove content not to be included in the digital signature, communication to an external signature-generation program and reception of the digital signature from that signature-generation program. The generation of the digital signature can be made conditional on the approval level of the user in relation to the approval level required for the range that is to be approved. When a level of approval is required, this approval level can be determined based on the subdocuments covered or the level of embedded approval signatures or by any other desired criteria. The approval level can be stored in the cover document with reference to approval levels stored in the PKI interface in the signature-generation program or module, or alternatively the cover document can store a list of allowed signers. The approval digital signature and any desired ancillary information are stored in the cover document, either as a text message, a hidden text message or as a subdocument object, or by any combination of these media. If subsequently any subdocument within this approval range is edited, any approval signature whose range encompasses this subdocument must be removed, as indicated by steps 208 and 209.

Higher-level approval signatures can be generated as indicated by step 213, encompassing ranges of approved subdocuments, as in steps 201-207, and additional subdocuments as in step 207. As in the generation of the lowest level approval signature the higher-level approvals represent a range on the cover document including the digital signatures represented on the cover document. The inclusion of the nested digital signatures assures the integrity of the documents and approvals within any level approval range.

Provision may be made for the removal of document signature generation and editing capability in the cover document when a level of approval is achieved. It is often desirable to programmatically disable these functions for subdocuments within an approval range after that approval signature has been entered. This is shown as step 214 locking the entire document after the highest level of approval signature, represented by step 213, but could be implemented at a lower level. For example, at step 210, editing of all subdocuments within that approval range could be programmatically prohibited.

The second embodiment of this invention is accomplished in the preferred embodiment by programmatically selecting a section of the cover document, including, since the cover document is a flat file, any subdocuments and digital signatures within this selection. This selection is then copied to a separate Microsoft Word Document opened as an object within the cover Microsoft Word Document or created as a separate temporary Word Document. The separate Microsoft Word Document is edited to remove content, such as formatting characters, that it is desired not to include in the digital signature and then exported to the signature-generation program or module. This signature-generation program returns an abort notice that is communicated to the user if the digital signature cannot be generated, or a digital signature, which is then copied into an appropriately formatted area within the cover document. The formatted area, including the digital signature, is delineated with an appropriately named bookmark to facilitate the deletion of the bookmark when an included subdocument is edited or to allow an easy search for the presence of an approval signature to programmatically disallow edits of subdocuments within the signature area.

In the first and second embodiments there is the export from an embedded document to an external digital signature-generation program. A common problem associated with the digital signing of a general document is the metadata contained in the document will prevent a document reproduced with the document's content from having the same hash function as a different version with the same content. In many cases, this can be avoided when the message consists only of the content of the subdocument by the export of the data as a text or binary file or transmission with no metadata. In other cases the metadata can be spoofed, as, for example, the regeneration in a consistent manner within a Word document of the metadata in order to avoid changing the dates, authors, version numbers, etc., so as to consistently generate identical Word files on different occasions. In the preferred embodiment, directed to military logs, the content was text and exported as a text file, but that is not a limitation on the general application of this invention.

In some cases the record of the sequence of signature generation and removal is of interest for audit purposes. At the time of any signature generation in either the first or second embodiment of this invention the fact and conditions of signature generation, deletion, or the failure to generate a digital signature can be appended to an internal or external audit log by the program.

The previous description of the first and second embodiments of this invention described maintaining the primary record of the subdocument in the cover document and the generation of auxiliary web documents for user input. When the cover document is maintained in a document server it may be preferable to maintain the cover document as a read-only file on the server. Creation, editing, signature generation and signature verification can be by the generation of a browser-readable web presentation, e.g. a HTML document, representing the information in a subdocument. Editing can be then accomplished by providing for the creation of a web page displaying the contents of the subdocument area of the cover page, with the contents of the subdocument being exposed for editing in the web page. The communication to this presentation can be by the program controlling the cover document opening a socket to the presentation, file transfer or any other means of inter-program communication.

Figure 4:
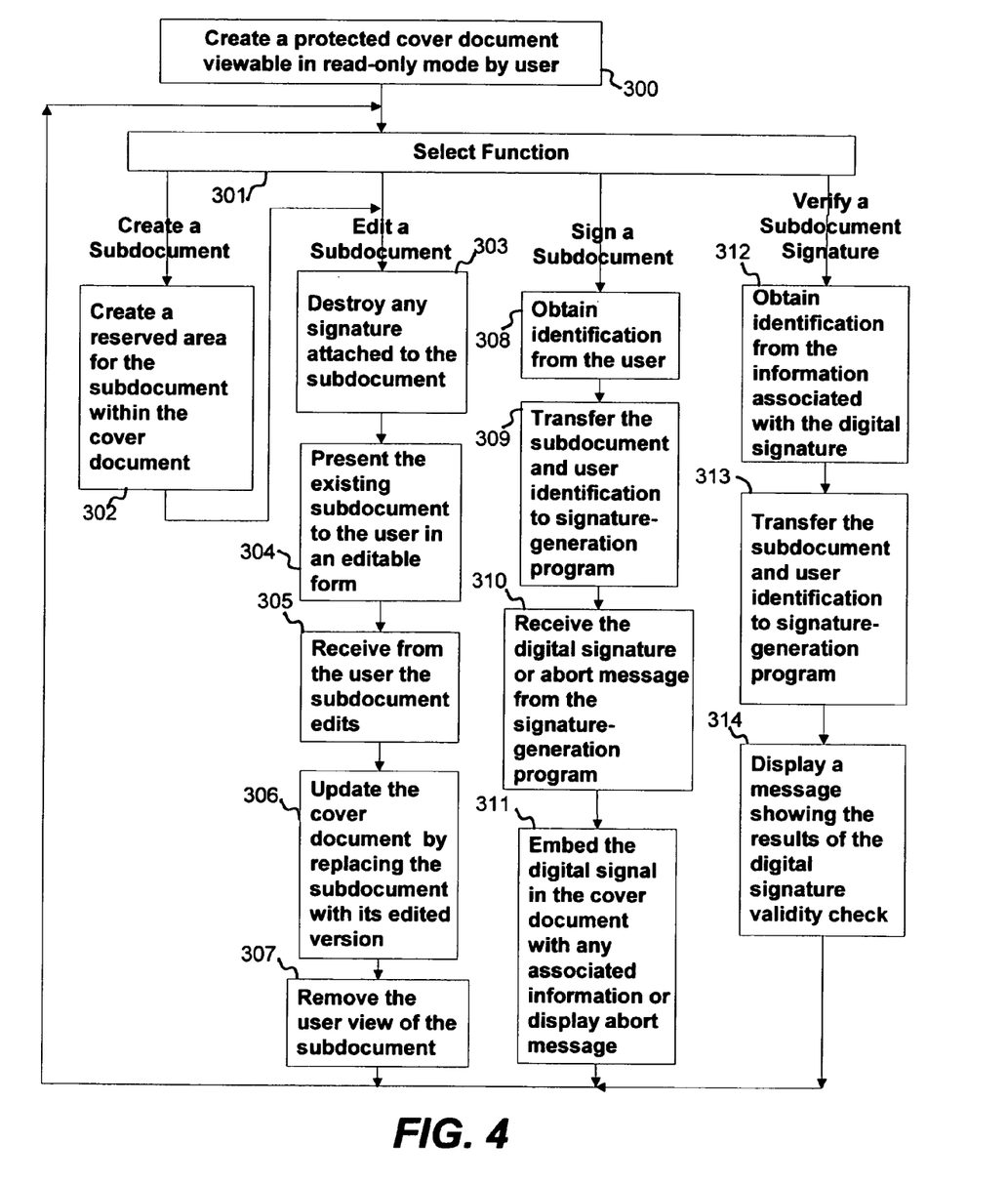
FIG. 4 illustrates a modification of the flow chart of FIG. 2 for use with a server-based implementation of the creation of a cover document to control the creation of subdocuments, and the editing, signature generation and signature verification of the subdocuments.

FIG. 4 represents the flow diagram for such a generalized interface. The read-only cover document created in step 300 can be either a text document or a database containing the subdocuments, approval signatures and ancillary information for presentation to the user through a report-generation program (such as Crystal Reports by Crystal Decisions, Inc.). Step 302 represents the creation of a subdocument as either a reserved area within a text document or a field within a database. If the edit function is selected the subdocument is presented to the user in an editable form, such as a browser text box. Any digital signature associated with an edited subdocument can be destroyed in step 303 or the decision to destroy the signature can be deferred until later in step 306 so the signature removal would only take place in the event the subdocument content is actually modified.

The user modifies the information in steps 304 and 305, through a browser-readable document or other user interface. In step 306 the subdocument in the cover document is updated by the information received from the user and the user view is removed in step 307. When the signature generation function is chosen the user identification is obtained from the user in step 308, and transferred by the program controlling the cover document to a signature-generation external program or internal module. When the digital signature is generated the cover document is updated as shown in step 311. A standard signature-generation program, such as the Java-based Trust Services Integration Kit by Verisign, Inc., can be used for communication to commercial PKI centers or many available digital signature modules, such as GnuPG by the Free Software Foundation, Inc., can be used to generate a localized PKI interface. These programs allow for signature verification as provided in step 313, and the validity information is presented to the user in step 314.

Figure 3:
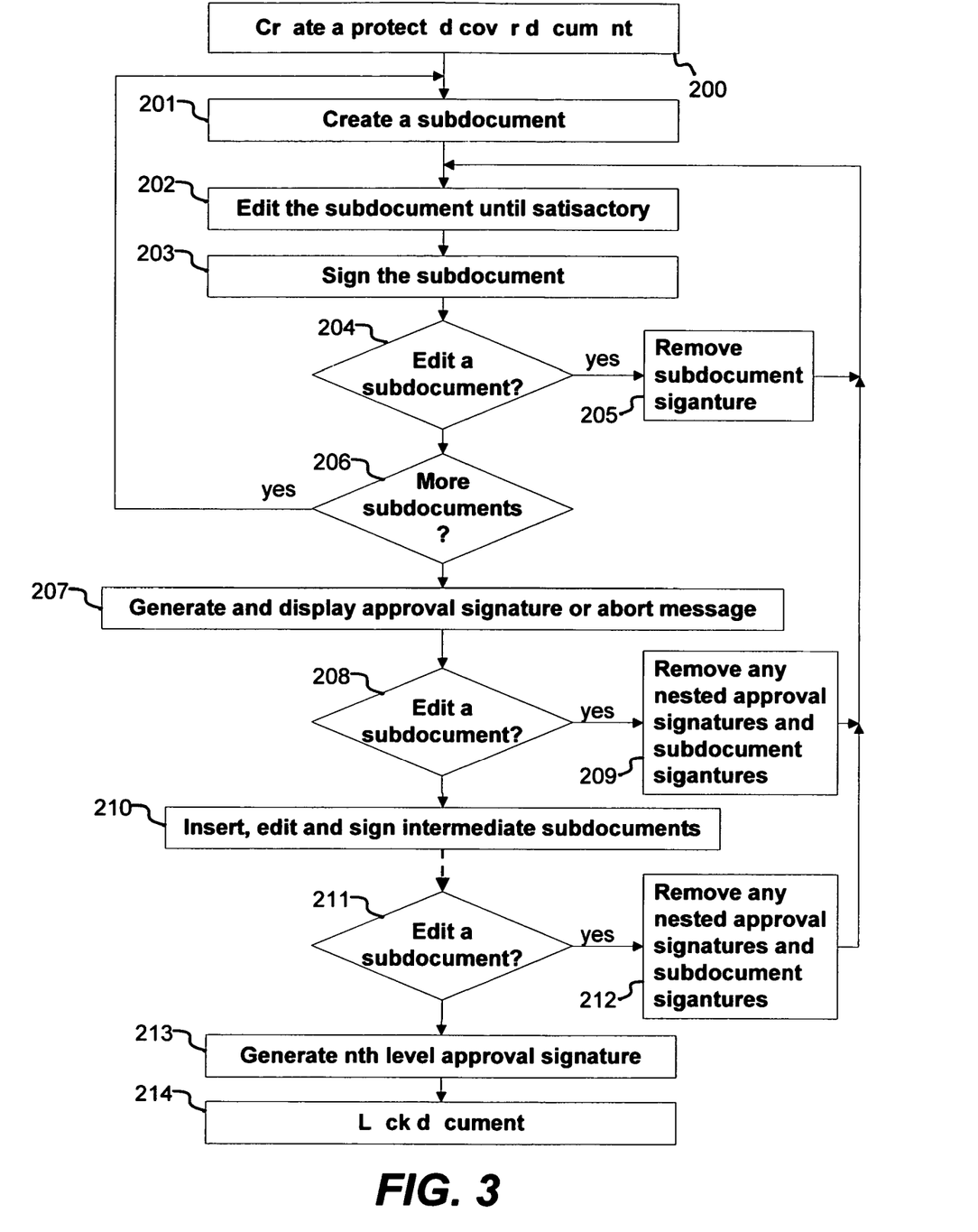
FIG. 3 illustrates the flow chart for the use of the methods of this invention in the creation of a hierarchy of approval signatures with each approval signature encompassing one or more subdocuments and zero or more approval signatures.

FIG. 3 assumes the generation of subdocuments in the manner described with reference to FIG. 2, and is equally valid for subdocuments generated in the manner described in FIG. 4. The generation of approval signatures from subdocuments generated in the manner of FIG. 4 proceeds from a server-based cover document that is either a text document or database. A space or database field in the cover document is reserved for the approval signature and subdocuments, approval signatures, and associated information associated with an approval signature range is either predefined or subject to user selection. The user identification is presented to the signature generation program together with the content of the signature approval range in a manner consistent with the signature verification module and the format of the signature generation module in step 207. The user communication for the identity input can be through a user-viewable document containing a browser-readable presentation, e.g. a HTML document and can be by means of file transfer, opening a socket to or from the presentation, or any other method of program communications.

In the user identification required for the generation of the digital signature use may be made not only by use of a username and password but also the reading of physical tokens or user characteristics such as RFID keys, proximity cards, biometric readers, "smart cards", and other personal identification as a means to augment the integrity of the verification. An example of the use of such tokens would be the reading of the electronically readable military ID cards in the case to verify the user's possession of this form of identification before allowing digital signature generation in the case of military logs.

Figure 5:
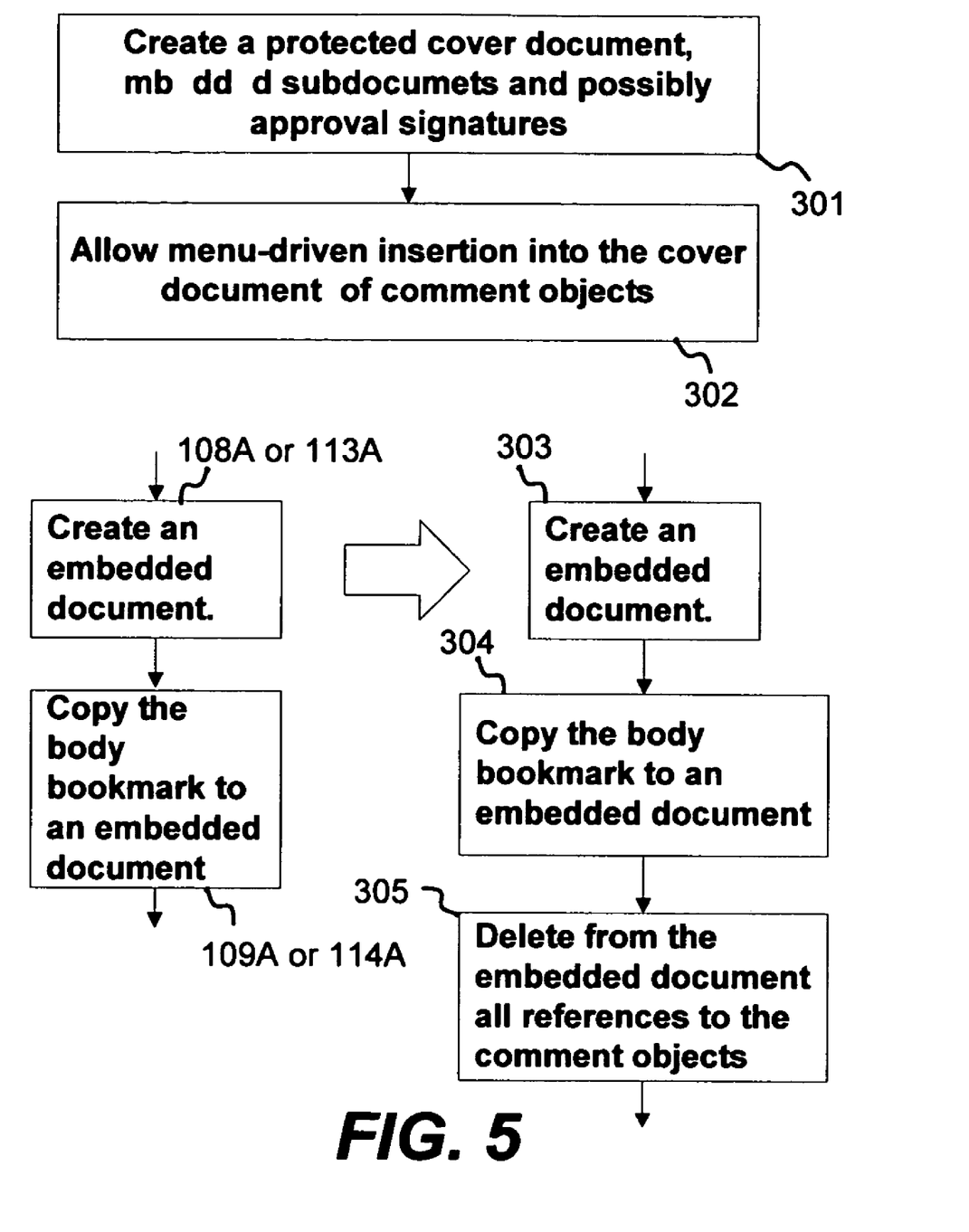
FIG. 5 illustrates a method for the creation of comments within the cover document without affecting the generation of digital signatures for the contents without the comments.

A discussion of the third embodiment of this invention will be made with reference to FIG. 5. In the process of creation, review and approval of a document with subdocuments there are often cases where questions regarding a subdocument are raised by reviewers. In these cases the subdocument may have been digitally signed and the insertion of the comments would ideally be separable from the signed documents so as not to invalidate the signatures when the comments are resolved with no changes to the documents. To achieve this desired functionality, provision is made for the insertion into the cover document of a comment object. This comment object can be in any data form including text, audio, image or video. Steps 301 and 302 illustrate the process for the object insertion. In the process of treating subdocuments illustrated by FIG. 2, the steps of 108-109 and 113-114 can be replaced by the steps of 303-305. When the subdocument is copied from the cover document to the subdocument object for signature processing, all references to the embedded comments are removed. This removal can also be accomplished during the process of copying in step 304 rather than in step 305.

The comment can be added by either inserting an embedded object containing the comment, a link to a comment object, or embedding the comment between a delineation character or character combination. The preferred embodiment of this third embodiment is accomplished by inserting in the cover document Microsoft Word comments, and removing these comments after the image of the subdocument or approval range is created for transfer to the signature-generation program for the calculation of the digital signature or the signature verification.

What is claimed is:

1. A method of controlling the digital signature process to allow controlled creation, modification, signature generation and signature verification of one or more subdocuments within a single cover document, each said subdocument differing from said cover document, comprising the steps of:

creating a protected cover document for the creation, display and editing of one or more said subdocuments within said cover document;

creating said subdocuments by reserving space within said cover document for each said subdocument and inserting subdocument content into said reserved space;

controlling through said cover document selective access to all said subdocuments within said cover document for display, editing, signature generation or signature verification;

creating through a menu associated with said cover document selective access to said subdocument for by selectively allowing write access to areas to be edited during the edit process and removing write access at the conclusion of editing, or by the means of presenting an unprotected copy of subdocument areas to be edited in a form suitable for editing and at the conclusion of editing replacing said subdocument areas by the edited copy;

providing through a menu associated with said cover document for the transmission of a representation of said subdocument or of a range of said subdocuments together with the user's identifying information to an internal or external signature-generation program to allow creation of a digital signature for said subdocument or range of subdocuments and for the verification of said digital signature; and providing in said cover document a display and for storage of any digital signature thereby created, together with the information required or useful to use said digital signature.

2. A method according to claim 1, wherein said creating through a menu associated with said cover document a means for the transmission of a representation of said subdocument to an internal or external signature-generation program to allow creation of a digital signature for each said subdocument and for the verification of said digital signature comprises the steps of:

creating a subdocument object embedded in said cover document or creating a separate document;

copying the contents of said subdocument into said subdocument object or said separate document;

obtaining from the user identifying information;

transmitting said identifying information and said subdocument object or said separate document to an external or internal signature-generation program for the generation of a digital signature; and placing the returned digital signature and any applicable identifying information in said cover document in text, hidden text, an embedded object, or a combination of these.

3. A method according to claim 1, further comprising the step of formatting said cover document suitable for printing in the final form and formatting contained subdocuments and signatures for data parsing.

4. A method according to claim 1, further comprising the step of verifying in said cover document the user identity utilized for the generation of digital signatures by requiring the simultaneous reading of physical tokens or user characteristics, such as RFID keys, proximity cards, biometric readers, "smart cards", and other unique personal identification means.

5. A method according to claim 1, further comprising the step of maintaining within said cover document or as a separate file under the control of said cover document an audit file containing a record of transactions such as signature generation attempts, signature generation failures, and digital signature generation deletions involved with digital signature generation through said cover document.

6. A method according to claim 1, further comprising the step of establishing a approval authority level hierarchy or a list of allowed approvers for said approval signature and preventing the generation of an approval signature if the signer violates rules of said approval level hierarchy.

7. A method according to claim 1 further comprising the step of allowing comments in said subdocument, comprising the steps of:

providing in said cover document a method of inserting comments into said subdocuments; and providing in said transmission of a representation of said subdocument or range of said subdocuments to an internal or external signature-generation program for the removal of any reference to said comments prior to the transmission to said signature-generation program.

8. A method according to claim 7, wherein said providing in said cover document a method of inserting comments into said subdocuments comprises the insertion into said subdocument of a link to a comment object in said cover document.

9. A method according to claim 7, wherein said providing in said cover document a method of inserting comments into said subdocuments comprises the insertion of said comment in said subdocument between delineation characters whereby said comment can be subsequently isolated.

10. A method of controlling the digital signature process to allow controlled creation, modification, signature generation and signature verification of one or more subdocuments within a single cover document, each said subdocument differing from said cover document, comprising the steps of:

creating a protected cover document for the creation, display and editing of one or more said subdocuments within said cover document;

creating said subdocuments within said cover document by creating for each said subdocument a separate file or object linked to an embedded location in said cover document and providing in said cover document the display of said subdocuments;

controlling through said cover document selective access rights to said subdocument for editing, signature generation or signature verification;

creating through a menu associated with said cover document an access to one or more said subdocuments within said cover document for edit and display of said subdocument by means of the presentation of said subdocument file or object, or a copy of said subdocument file or object, with write protection removed in a form amenable to edit, and at the conclusion of editing the replacement of said subdocument file or object with the edited file or object with write protection restored;

creating through a menu associated with said cover document a means for the transmission of a representation of said subdocument to an internal or external signature-generation program to allow creation of a digital signature for each said subdocument and for the verification of said digital signature; and providing in said cover document a means for the display and storage of any said digital signature created for said subdocument, together with the information required or useful to use said digital signature.

11. A method according to claim 10, wherein said creating through a menu associated with said cover document a means for the transmission of a representation of said subdocument to an internal or external signature-generation program to allow creation of a digital signature for each said subdocument and for the verification of said digital signature comprises the steps of:

creating a subdocument object embedded in said cover document or creating a separate document;

copying the contents of said subdocument into said subdocument object or said separate document;

obtaining from the user identifying information;

transmitting said identifying information and said subdocument object or said separate document to an external or internal signature-generation program for the generation of a digital signature; and placing the returned digital signature and any applicable identifying information in said cover document in text, hidden text, an embedded object, or a combination of these.

12. A method according to claim 10, further comprising the step of formatting said cover document suitable for printing in the final form and formatting the contained subdocuments and signatures for data parsing.

13. A method according to claim 10, further comprising the step of verifying in said cover document the user identity utilized for the generation of digital signatures by requiring the simultaneous reading of physical tokens or user characteristics, such as RFID keys, proximity cards, biometric readers, "smart cards", and other unique personal identification means.

14. A method according to claim 10, further comprising the step of maintaining within said cover document or as a separate file under the control of said cover document an audit file containing a record of transactions such as signature generation attempts, signature generation failures, and digital signature generation deletions involved with digital signature generation through said cover document.

15. A method according to claim 10, further comprising the step of establishing a approval authority level hierarchy or a list of allowed approvers for said approval signature and preventing the generation of an approval signature if the signer violates rules of said approval level hierarchy.

16. A method according to claim 10 further comprising the step of allowing comments in said subdocument, comprising the steps of:
   providing in said cover document a method of inserting comments into said subdocuments; and
   providing in said transmission of a representation of said subdocument or range of said subdocuments to an internal or external signature-generation program for the removal of any reference to said comments prior to the transmission to said signature-generation program.

17. A method according to claim 16, wherein said providing in said cover document a method of inserting comments into said subdocuments comprises the insertion into said subdocument of a link to a comment object in said cover document.

18. A method according to claim 16, wherein said providing in said cover document a method of inserting comments into said subdocuments comprises the insertion of the comment in said subdocument between delineation characters whereby the comment can be subsequently isolated.

19. A method of creating a hierarchy of subdocuments and approval signatures, comprising the steps of:
   creating a protected cover document for the creation, display and editing of said subdocuments and for controlling through said cover document access to said subdocuments for creation, editing, signature generation or signature verification;
   creating through a menu associated with said cover document the ability to access and edit a representation of said subdocument object that is then transferred to a visible, protected display in said cover document;
   creating through a menu associated with said cover document for the transmission of a subdocument to a signature-generation program to allow creation of a digital signature for each subdocument and for the verification of that digital signature;
   providing through a menu associated with said cover document a display and/or storage of any digital signature created for a subdocument, together with the information required or useful to use said digital signature;
   providing through a menu associated with said cover document the generation of an approval signature for an approval range of said cover document including one or more subdocuments, any associated digital signatures and accompanying signature information, or other approval signatures;
   providing protection to the integrity of the approval signature by either preventing the editing of subdocuments within the approval range for a signed approval signature or destroying any approval signature whose approval range includes an edited subdocument; and
   providing in said cover document a display and/or storage of any approval signature, together with the information required or useful to use said approval signature.

20. A method according to claim 19 further comprising the step of allowing comments in said subdocument, comprising the steps of:
   providing in said cover document a method of inserting comments into said subdocuments; and
   providing in said transmission of a representation of said subdocument or range of said subdocuments to an internal or external signature-generation program for the removal of any reference to said comments prior to the transmission to said signature-generation program.

* * * * *